United States Patent
Sharpe et al.

(10) Patent No.: US 9,121,423 B2
(45) Date of Patent: Sep. 1, 2015

(54) MULTI-FUNCTIONAL CLAMP

(71) Applicants: Gary L. Sharpe, Naples, FL (US); Brian Dutro, Columbus, OH (US)

(72) Inventors: Gary L. Sharpe, Naples, FL (US); Brian Dutro, Columbus, OH (US)

(73) Assignee: Gary L. Sharpe, Naples, FL (US)

( * ) Notice: Subject to any disclaimer, the term of this patent is extended or adjusted under 35 U.S.C. 154(b) by 0 days.

(21) Appl. No.: 14/182,612

(22) Filed: Feb. 18, 2014

(65) Prior Publication Data

US 2014/0231605 A1 Aug. 21, 2014

Related U.S. Application Data

(60) Provisional application No. 61/766,442, filed on Feb. 19, 2013.

(51) Int. Cl.
*A47B 96/00* (2006.01)
*F16B 2/06* (2006.01)
*F16M 13/02* (2006.01)
*F16M 11/04* (2006.01)
*F16M 11/10* (2006.01)
*H05B 37/02* (2006.01)

(52) U.S. Cl.
CPC .............. *F16B 2/065* (2013.01); *F16M 11/041* (2013.01); *F16M 11/105* (2013.01); *F16M 13/022* (2013.01); *H05B 37/0254* (2013.01); *F16M 2200/022* (2013.01); *F16M 2200/027* (2013.01)

(58) Field of Classification Search
CPC ... F16M 13/02; F16M 13/022; F16M 11/041; F16M 11/105; F16M 2/065; F16M 2200/022; F16M 2200/027

USPC ............ 248/222.13, 222, 14, 220.21, 220.22, 248/229.15, 229.25, 228.6, 230.6, 231.71, 248/230.1, 223.41
See application file for complete search history.

(56) References Cited

U.S. PATENT DOCUMENTS

| | | | |
|---|---|---|---|
| 1,266,367 A * | 5/1918 | Wilson | 5/646 |
| 3,902,931 A | 9/1975 | Danciger | |
| 4,702,448 A | 10/1987 | Lojacono | |
| 4,875,651 A | 10/1989 | Wergin | |
| 4,903,929 A * | 2/1990 | Hoffman | 248/229.15 |
| 5,174,533 A * | 12/1992 | Pryor et al. | 248/288.51 |
| 5,190,257 A | 3/1993 | Gradei | |
| 5,312,079 A | 5/1994 | Little | |
| 5,322,253 A * | 6/1994 | Stevens | 248/229.15 |
| 5,326,059 A * | 7/1994 | Pryor et al. | 248/231.71 |
| 5,775,652 A * | 7/1998 | Crawshaw et al. | 248/230.6 |
| 5,829,723 A * | 11/1998 | Brunner et al. | 248/222.13 |
| 6,079,678 A * | 6/2000 | Schott et al. | 248/229.15 |
| 6,119,992 A | 9/2000 | Stuart | |
| 6,481,679 B1 * | 11/2002 | Bennett et al. | 248/224.51 |
| 7,111,812 B2 | 9/2006 | Shannon | |

(Continued)

OTHER PUBLICATIONS

European Patent Office, Extended European Search Report for European Patent Application No. 14155643.1-1751, Aug. 29, 2014.

*Primary Examiner* — Todd M Epps
(74) *Attorney, Agent, or Firm* — Standley Law Group LLP (57) ABSTRACT

A multi-directional clamping device having a clamp body, a mounting block and a mounting slide is described herein. The clamp body has a first and second arm forming the C-shaped clamp body. The mounting block having a conical receptacle therein is attached to the clamp body such that the base of conical shape faces upward. The mounting slide has a conical slide for complementary engagement with the mounting block.

20 Claims, 5 Drawing Sheets

(56) References Cited

U.S. PATENT DOCUMENTS

| | | | |
|---|---|---|---|
| 7,546,993 B1 * | 6/2009 | Walker | 248/218.4 |
| 8,459,602 B2 * | 6/2013 | Herskovic | 248/230.1 |
| 8,695,957 B2 * | 4/2014 | Quintania et al. | 269/74 |
| 8,820,690 B2 * | 9/2014 | Weber | 248/229.15 |
| 2005/0151040 A1 | 7/2005 | Hsu | |
| 2006/0278781 A1 | 12/2006 | Homra | |
| 2007/0267551 A1 | 11/2007 | Townsend | |
| 2011/0064548 A1 | 3/2011 | Wrolson | |

* cited by examiner

MULTI-FUNCTIONAL CLAMP

CROSS-REFERENCE TO RELATED APPLICATIONS

This application claims priority to U.S. Provisional Patent Application No. 61/766,442 and incorporates this application as if fully rewritten herein.

TECHNICAL FIELD

The present invention relates to a clamp for attachment to various surfaces. More particularly, embodiments of the invention relate to a clamp for attachment in both a horizontal or vertical arrangement having an adjustable and movable holding device.

BACKGROUND OF THE ART

In the medical field, a large number of instruments and other items are commonly needed for patient monitoring and treatment, both in hospital and outpatient settings. This equipment must be supported and stabilized adjacent to the patient both in a hospital room and during transportation of the patient. Instruments typically found needing support are heart monitors and other treatment and monitoring devices.

Although clamps are currently used for some situations, most are overly complex requiring two hands to operate which is difficult in the hospital setting, especially during emergency situations. Moreover, traditional clamping systems are only designed for a single type of surface and are limited to either a vertical or horizontal configuration. Although there are some clamping systems that offer attachment to both vertical and horizontal surfaces, they often use ball joints and are subject to instability due to the weight of the item supported.

Accordingly, being able to clamp items in a manner that is both easy to use and accommodates either vertical or horizontal surfaces is an ongoing challenge in the industry. Consequently, there is a need for a clamping device that is easy to use and that is adjustable to accommodate both vertical and horizontal surfaces.

SUMMARY OF THE INVENTION

Accordingly, exemplary embodiments of the present invention have been made to remedy the previously mentioned problems. The exemplary embodiments described herein provide a clamping device that is easy to use and very versatile in a hospital or clinic setting. In the exemplary embodiments, the clamping device has a simple insertion method of supporting items that can be accomplished by one handed manipulation. The exemplary clamping device also easily converts for application to both vertical and horizontal surfaces.

Exemplary embodiments of the clamping device have a three part design that includes a C-clamp body, a mounting block and a mounting slide. The C-clamp body is affixed to either a vertical or horizontal surface through the use of a clamping screw. To facilitate the secure attachment of the mounting block to the clamp body, the clamp body has channels disposed therein. The channels cross one another creating an X pattern, and are aligned with one channel running with the clamp screw and the other channel running essentially perpendicular to the clamp screw. An aperture for a mechanical fastener is provided at the intersection of the channels.

The mounting block has protrusions that fit within the channels when the mounting block is brought into contact with the clamp body. The indexing of the protrusions within the channels prevents rotational motion of the mounting block relative to the clamp body. An opening is provided in the mounting block and aligns with the aperture in the clamp body for the use of a mechanical fastener to secure the mounting block to the clamp body. To adjust the clamp device for attachment to horizontal surfaces or vertical surfaces, the protrusions on the mounting block are simply moved from one channel on the clamp body to the other.

The mounting block also has a substantially conical shaped receptacle therein for attachment of the mounting slide. The receptacle has a passage to prevent rotational motion of the mounting slide relative to the mounting block. The mounting slide has a mounting plate for attachment to the item to be supported. This can be accomplished by adhesives, mechanical fasteners and other means. The mounting slide has a substantially conical attachment slide extending from the mounting plate for insertion with the receptacle on the mounting block. The attachment slide is connected to the mounting plate by way of an isthmus, the isthmus is received in the passage in the receptacle to prevent rotational motion. Once the attachment slide is inserted into the receptacle, gravity holds the slide within the receptacle.

BRIEF DESCRIPTION OF THE DRAWINGS

The advantages and other characteristics of the disclosed embodiments will be better understood when attention is directed to the accompanying drawings, wherein identical elements are identified with identical reference numerals and wherein.

DETAILED DESCRIPTION OF THE EXEMPLARY EMBODIMENTS

Exemplary embodiments of the present invention will now be described in greater detail. It should be recognized that the present invention can be practiced in a wide range of other embodiments besides those explicitly described, and the scope of the exemplary embodiments described are expressly not limited.

Figure 1:
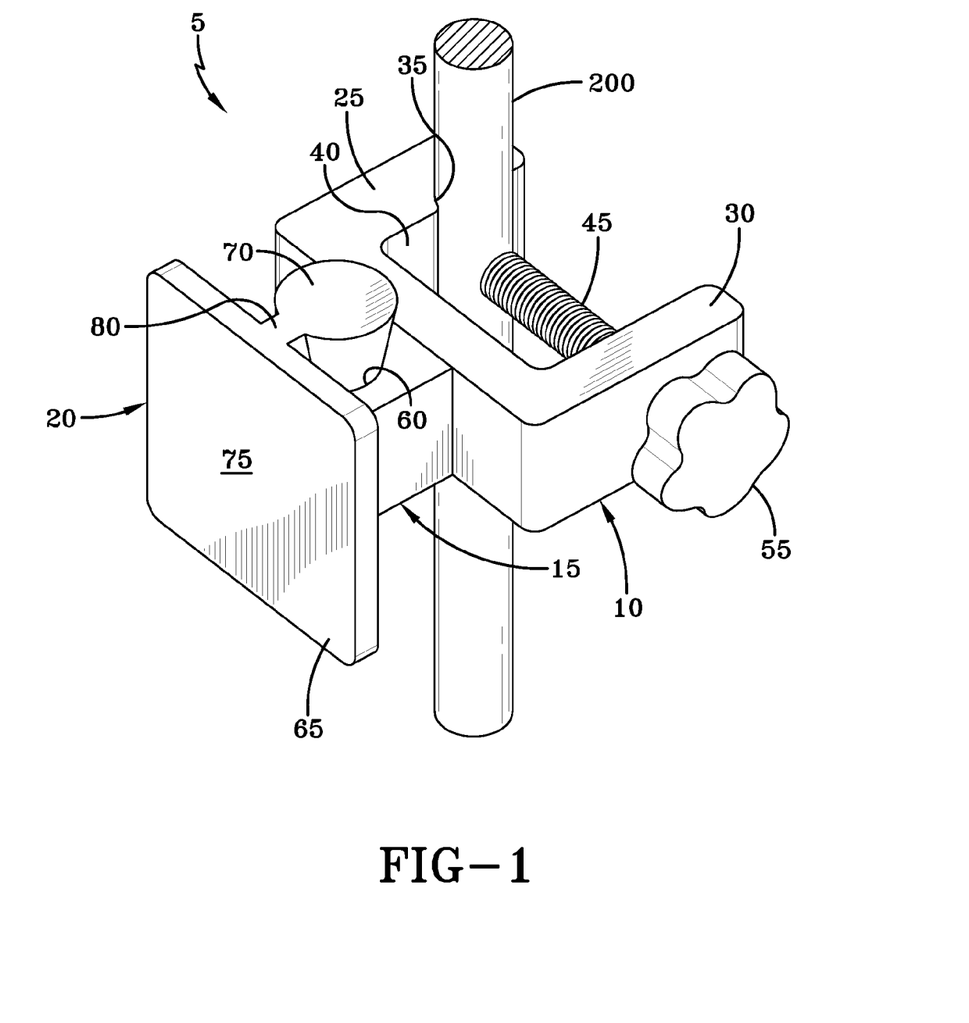
FIG. 1 is a perspective view of an exemplary embodiment of a clamp according to the inventive concept, shown affixed to a cylindrical body.
Figure 2:
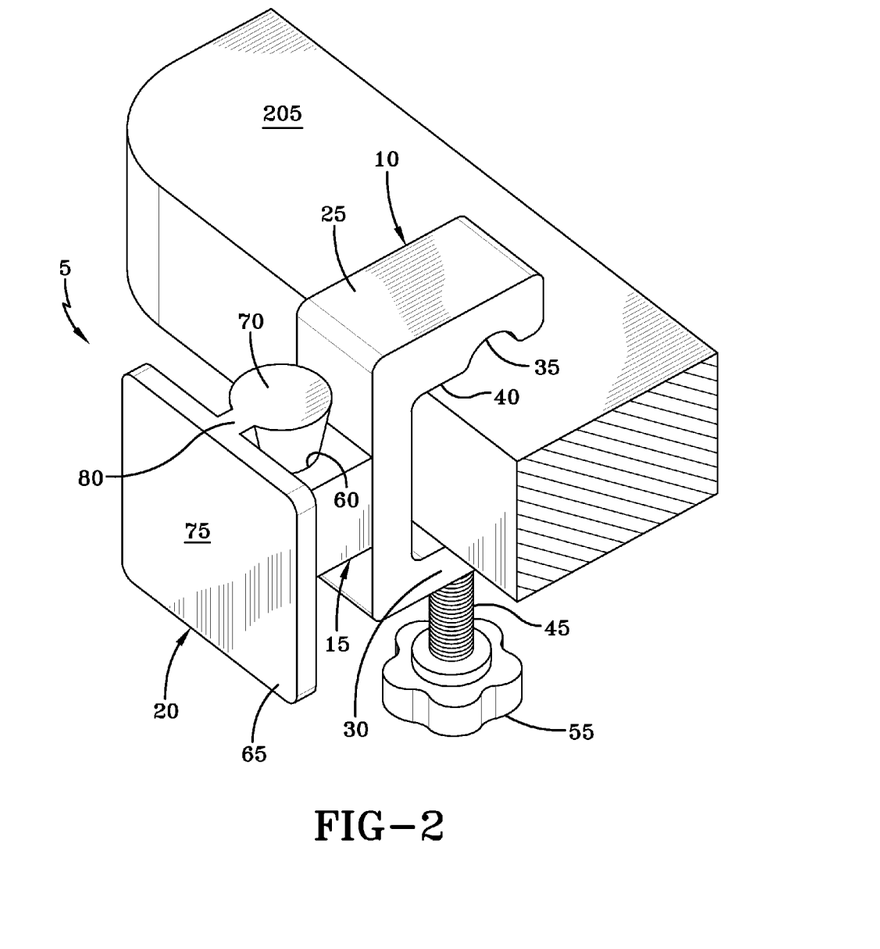
FIG. 2 is a perspective view of an exemplary embodiment of a clamp according to the inventive concept, shown affixed to a horizontal surface.

Directing attention to the drawings and particularly to FIGS. 1-2. FIG. 1 is a perspective view of a clamping device 5 formed from three parts: a clamp body 10, a mounting block 15, and a mounting slide 20 according to the inventive concept. As best illustrated in FIGS. 1-4, the clamp body 10 is basically a C-clamp having opposing asymmetrical first and second arms 25, 30, the first arm 25 having a recess 35 in an inwardly facing, flat clamping surface 40. A clamping screw 45 extends through a bore 50 (shown in FIG. 3) in the second arm 30 which is aligned with recess 35. A handle 55 is provided on the end of the clamping screw 45 remaining outside the clamp body 10. The handle 55 may have ridges or grooves to provide a user a surface conducive for manipulation of the clamp screw 45.

With the features and arrangement of the clamp body 10, the clamp device 5 may be clamped to pole 200. The recess 35 can be placed against one side of a vertical or horizontal a pole 200 and the clamp screw 45 is screwed into clamping engagement with the opposite side of the pole 200, so that the pole 200 is clamped between the clamping screw 45 and the recess 35. Alternatively, the clamping device 5 can be clamped to a flat surface 205 (as shown in FIG. 2) with the flat surface 40 placed against one face of the surface 205 and the clamping screw 45 screwed into clamping engagement with the opposite face of the surface 205, as generally illustrated in FIG. 2. Thus, the clamping device 5 can be secured to any round support member, any radiused surface or any flat surface edge, whether oriented vertically or horizontally. This feature provides a large choice of clamping surfaces in any typical hospital, clinical, or home environment.

Figure 4:
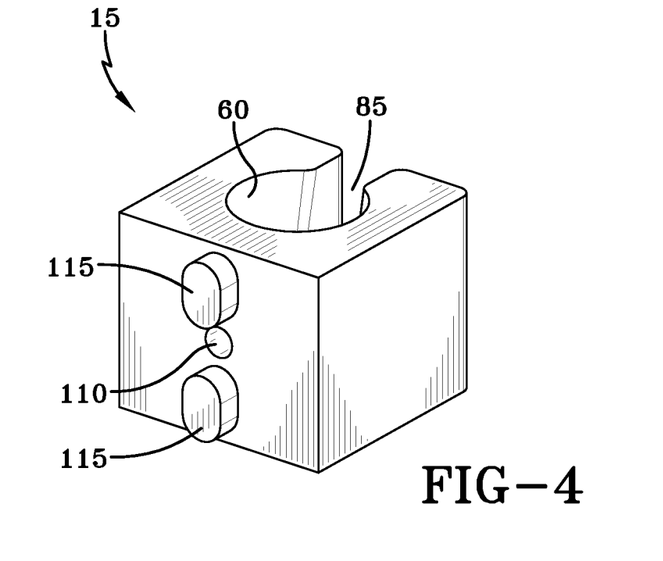
FIG. 4 is a perspective view of the mounting block of an exemplary clamp according to the inventive concept.

The clamping device 5 has a projecting rectangular mounting block 15 projecting outwardly from the clamp body 10 in the opposite direction to the first and second arms 25, 30. The mounting block 15 is a separate part and is removably secured to the clamping body 10. The mounting block has a receptacle 60 therein. The receptacle 60 extends inward from one side of the mounting block toward the opposing side of the mounting block 15. The axis of the receptacle 60 is substantially perpendicular to at least two opposing sides of the mounting block 15, as shown in FIG. 4.

The third part of the mounting device 5 is a mounting slide 20 for mounting an instrument, storage device, or other piece of equipment on the mounting device 5. The mounting slide 20 has a mounting plate 65 and an attachment slide 70 extending therefrom. The mounting plate 65 forms a surface 75 where an adhesive may be applied so the mounting slide 20 and can be affixed to a piece of equipment needing support. In other embodiments, mechanical fasteners (not shown) may be used to affix the equipment to the mounting slide 20. The attachment slide 70 extends from the mounting plate 65, opposite said surface 75, and has a substantially conical shape. The slide 70 is fixed to the mounting plate 65 by an isthmus 80 running the length of the slide 70.

Accordingly, the receptacle 60 has a complementary conical shape and passage 85 (shown in FIGS. 3 and 5) to receive the slide 70 and isthmus 80. To secure the mounting slide 20 to the mounting block 15, the attachment slide 70 is slid into the receptacle 60 until the slide 70 is prevented from further insertion due to the decreased diameter of the receptacle 60, creating a nested or mating arrangement. Accordingly, the receptacle 60 and the slide 70 can be assigned gender designations, wherein the slide 70 is a male connector and the receptacle 60 is a female connector.

If the clamping device 5 is clamped onto a suitable vertical surface such as an IV pole 200, as illustrated in FIG. 1, the axis of the receptacle 60 is approximately perpendicular with the clamping direction of the clamping device 5. In this arrangement, the portion of the receptacle 60 having the largest internal diameter will face upward. The slide 70 can then be easily aligned with receptacle 60 and lowered so that the slide 70 engages the receptacle 60 as illustrated in FIG. 1. Once in the engaged position, the isthmus' 80 location within the passage 85 prevents rotational motion of the mounting slide 20 relative to the mounting block 15. Thus, equipment or instruments can be suspended from the mounting plate 65.

The clamping device 5 may alternatively be clamped onto a horizontal flat surface 205, in the orientation illustrated in FIG. 2, where the mounting block 15 would be attached to the clamp body 10 such that the axis of the receptacle 60 is approximately parallel with the clamping direction. In this orientation, the portion of the receptacle 60 having the largest diameter will face upward. The mounting slide 20 may be moved quickly and easily from one clamping device 10 to another clamping device 10 situated elsewhere or in a different configuration, simply by lifting the slide 70 from the receptacle 60 sliding it into a different receptacle 60 on another device 10.

Figure 3:
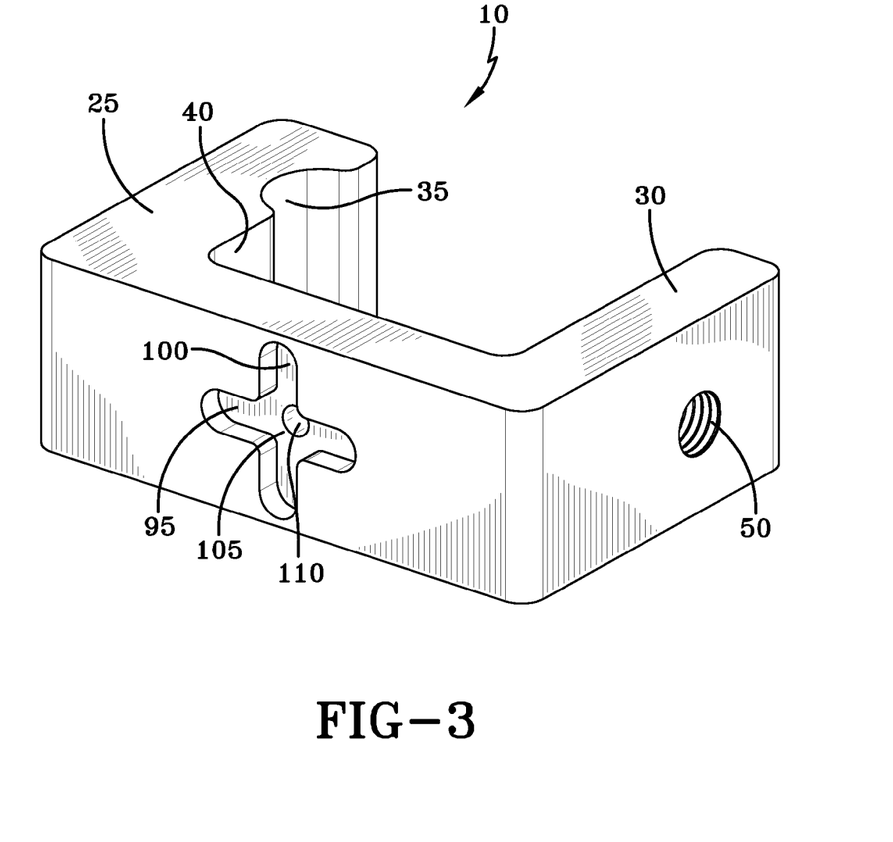
FIG. 3 is a perspective view of the clamp body of an exemplary clamp according to the inventive concept.

FIG. 3 illustrates the C-shaped body of the clamp body 10, having opposing arms 25, 30. The first arm 25 having a recess 35 in an inwardly facing, clamping surface 40. The second arm 30 has a bore 50 aligned with the recess 35. The recess 35 and the flat surface 40 may be coated with a non-slip material to further assist in securing the clamp device 5. Perpendicular first and second channels 95, 100 are present on the exterior of the clamp body 10 and intersect at a cross over region 105. The channels 95, 100 have a depth but do not penetrate the entire thickness of the clamp body 10. An aperture 110 resides at the cross over region 105 allowing the mounting block 15 to be attached to the clamp body 10.

The rectangular or substantially cuboid mounting block 15 having a receptacle 60 therein is illustrated in FIG. 4. The receptacle 60 extends through the mounting block 15 through opposing sides. The receptacle 60 has a conical shape to receive the slide 70 of the mounting slide 20. A passage 85 is provided in one side of the mounting block 15 and extends inward to join with the receptacle 60. The passage 85 is positioned such that the isthmus 80 resides therein when the slide 70 is engaged with the receptacle 60. The side of the mounting block 15 opposite the passage 85 has two protrusions 115 extending outwardly therefrom. The protrusions 115 are in a spaced apart configuration having an opening 120 therebetween. The interior of the opening 120 may be threaded to receive a threaded fastener. The protrusions 115 are configured to enter either the first or second channels 95, 100 depending on relative arrangement of the mounting block 15 to the clamp body 10. By being indexed in a channel 95, 100, the protrusions 115 prevent rotational motion between the mounting block 15 and the clamp body 10. The protrusions 115 are sized such that the side of the mounting block 15 having the protrusions 115 is in intimate contact with the exterior of the clamp body 10 when the mounting block 15 and clamp body 10 are secured together. When the receptacle 60 is arranged parallel to the clamping direction, the protrusions 115 are indexed in the first channel 95. When the receptacle 60 is arranged perpendicular to the clamping direction, the protrusions 115 are arranged in the second channel 100. When the protrusions 115 are engaged with a channel 95, 100, the opening 120 is aligned with the aperture 110 in the clamp body 10. This alignment allows a mounting block 15 to be fastened to the clamp body 10 using a threaded fastener or other similar type fastener.

Figure 5:
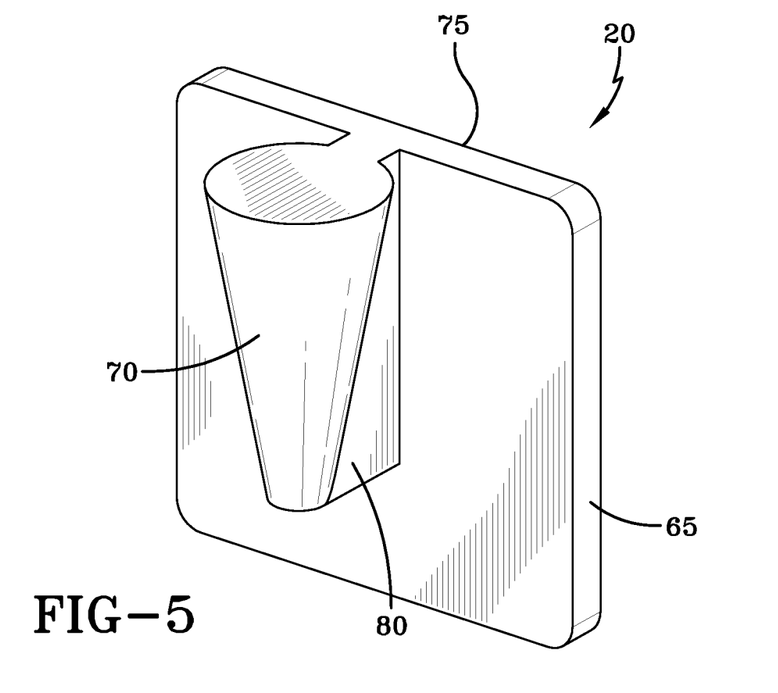
FIG. 5 is a perspective view of the mounting slide of an exemplary clamp according to the inventive concept.

The mounting slide 20 having a mounting plate 65 and an attachment slide 70 extending therefrom is illustrated in FIG. 5. The mounting plate 65 forms a surface 75 for connection to a piece of equipment or item that needs support. Adhesives, mechanical fasteners and the like may be used to affix the mounting plate 65 to the item that needs support. The attachment slide 70 extends from the mounting plate 65 opposite the surface 75 and has a substantially conical shape. The slide 70 is attached to the mounting plate 65 by an isthmus 80 running the length of the slide 70. Although it should be understood that other embodiments of the mounting slide 20 may have a shorter isthmus 80. To join the mounting slide 20 to the remainder of the mounting device 5, the attachment slide 20 is simply inserted into the receptacle 60 on the mounting block 15. The complementary conical shape of the receptacle 60 receives the attachment slide 20 and prevents it from completely passing through the receptacle 60. Thus, the attachment slide 20 is held within the receptacle 60 by gravity. The isthmus 80 being received by the passage 85 prevents rotational motion of the mounting slide 20 relative to the mounting block 15.

Figure 6:
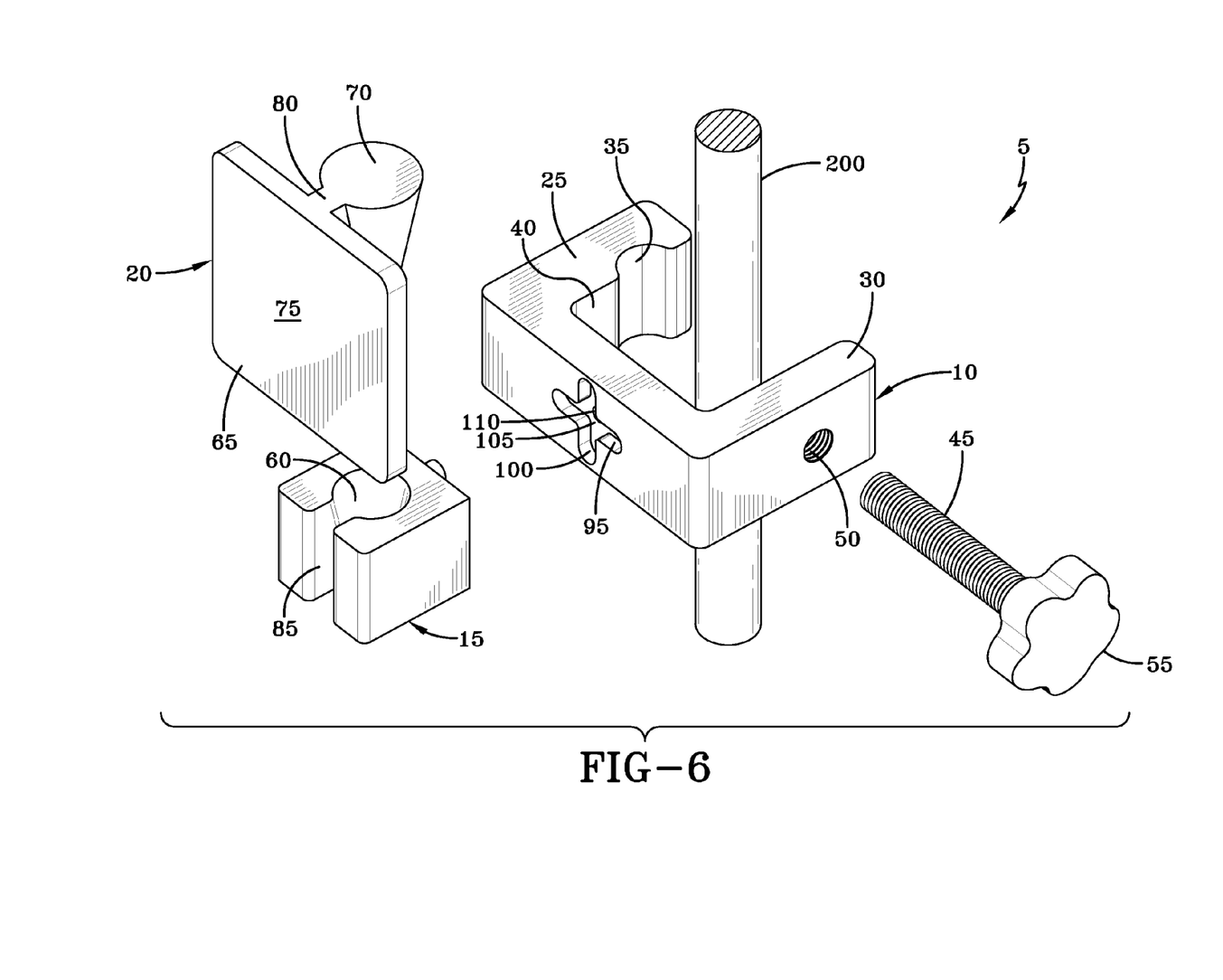
FIG. 6 is an exploded view of the exemplary embodiment shown in FIG. 1, shown affixed to a vertical cylindrical body.

FIG. 6 is an exploded view of the exemplary clamping device 5 illustrating the relative positions of the clamping body 10, the mounting block 15, and the mounting slide 20 prior to use. As illustrated, the clamping device 5 is clamped onto a suitable vertical pole 200 and the axis of the receptacle 60 is approximately perpendicular with the clamping direction of the clamping device 5. To affix the mounting block 15 to the clamp body 10, the protrusions 115 are positioned to align with the channel 100 running vertically. This arrangement ensures that the portion of the receptacle 60 having the largest diameter is facing upward. After the protrusions 115 are indexed in the channel 100, a fastener may be passed through opening 120 and aperture 110 to secure the mounting block 15 to the clamp body 10. Once the clamp body 10 and the mounting block 15 are securely fastened, the mounting slide 20 may be joined to the mounting block 15. As described above, to join the mounting slide 20 the attachment slide 70 is simply inserted into the receptacle 60 and gravity holds the mounting slide 20 in place due to the complementary conical shapes of the attachment slide 70 and the receptacle 60.

To further effectuate the convenience of the exemplary clamping device 5, multiple mounting slides 20 may be used. This feature allows the mounting slides 20 to be pre-attached to items in need of support. This eliminates the requirement of attachment, removal and re-attachment of the mounting slides 20 when different items are to be supported.

While the embodiments disclosed described the best modes known to the inventor at the time of filing, the scope of the invention is not to be limited to only the embodiments disclosed herein.

What is claimed is:

1. A clamp apparatus, comprising:
a clamp body,
a first arm and a second arm extending from the clamp body forming a C-shape;
a first channel and a second channel intersecting perpendicular to one another forming an X-pattern in an exterior of the clamp body;
a mounting block having a receptacle therein;
a series of protrusions extending from the mounting block, said protrusions adapted to be inserted into either the first or second channel of the clamp body preventing rotation of the mounting block relative to the clamp body when the mounting block is affixed to the clamp body; and
a mounting slide in communication with the mounting block.

2. The clamp of claim 1, wherein the first arm has a clamping surface having a recess therein.

3. The clamp of claim 1, wherein the second arm has a clamping surface and a bore passing through the second arm.

4. The clamp of claim 3, further comprising a clamp screw retained within said bore.

5. The clamp of claim 1, further comprising an aperture positioned at the intersection of the first and second channels.

6. The clamp of claim 1, wherein the mounting block is cuboid.

7. The clamp of claim 1, further comprising a conical receptacle in the mounting block.

8. The clamp of claim 6, further comprising a passage running the length of a side of the cuboid mounting block extending from a surface of the mounting block and terminating in a conical receptacle in the mounting block.

9. The clamp of claim 1, wherein the mounting slide has a mounting plate having a mounting surface.

10. The clamp of claim 9, further comprising a slide attached to the mounting plate by an isthmus, the slide extending from the mounting plate opposite the mounting surface.

11. A clamp apparatus, comprising:
a clamp body having a first and a second arm extending therefrom forming a C-shape, the first arm having a clamping surface with a recess therein and the second arm having a clamping surface and a bore passing through the second arm for retaining a clamping screw;
a first channel and a second channel intersecting perpendicular to one another forming an X-pattern in an exterior of the clamp body;
a mounting block having a conical receptacle therein;
a series of protrusions extending from the mounting block, said protrusions adapted to be inserted into either the first or second channel of the clamp body preventing rotation of the mounting block relative to the clamp body when the mounting block is affixed to the clamp body; and
a mounting slide, the mounting slide having a mounting plate including a mounting surface and a slide, the slide having a conical shape for complementary engagement with the mounting block.

12. The clamp of claim 11, further comprising an aperture within the clamp body positioned at the intersection of the first and second channels.

13. The clamp of claim 12, wherein the mounting block is cuboid.

14. The clamp of claim 13, further comprising a passage running the length of a side of the cuboid mounting block extending from a surface of the mounting block and terminating in the conical receptacle in the mounting block.

15. The clamp of claim 14, further comprising a hole defined by the mounting block positioned between the protrusions, the hole aligns with the aperture in the clamp body when the protrusions are placed in either the first or second channel to allow attachment of the mounting block of the clamp body.

16. The clamp of claim 15, wherein the slide is attached to the mounting plate by an isthmus and extends from the mounting plate opposite from the mounting surface.

17. The clamp of claim 14, wherein the isthmus resides in the passage when the slide is placed within the receptacle.

18. A clamp apparatus, comprising:
a clamp body having a first and a second arm extending therefrom forming a C-shape, the first arm having a clamping surface with a recess thereon and the second arm having a clamping surface and a bore passing through the second arm for retaining a clamping screw;
a first channel and a second channel intersecting perpendicular to one another forming an X-pattern in an exterior of the clamp body;
an aperture defined by said clamp body located at the intersection of the first and second channels;
a cuboid mounting block having a conical receptacle therein;
a passage provided in said mounting block, the passage running the length of a side of the cuboid mounting block extending from a surface of the mounting block and terminating in the conical receptacle in the mounting block;

a pair of protrusions in a spaced apart configuration extending from the mounting block opposite the passage, the protrusions adapted to be inserted into either the first or second channel of the clamp body preventing rotation of the mounting block relative to the clamp body when the mounting block is affixed to the clamp body;

a hole defined by the mounting block positioned between the pair of protrusions, the hole is positioned to align with the aperture in the clamp body when the pair of protrusions are placed in either the first or second channel to allow secure attachment of the mounting block to the clamp body;

a mounting slide having a mounting plate with a mounting surface; and a slide attached to the mounting plate by an isthmus, the slide attached to the mounting plate opposite the mounting plate, wherein the slide has a conical shape for complementary engagement with the receptacle in the mounting block.

19. The clamp of claim 18, wherein the isthmus rests in the passage when the slide is placed in the receptacle preventing rotation of the slide within the receptacle.

20. The clamp of claim 19, a fastener residing in the hole and the aperture to secure the mounting block to the clamp body.

* * * * *